Feb. 22, 1949.
P. PAETOW
2,462,542
FEED GRINDER
Filed March 21, 1946
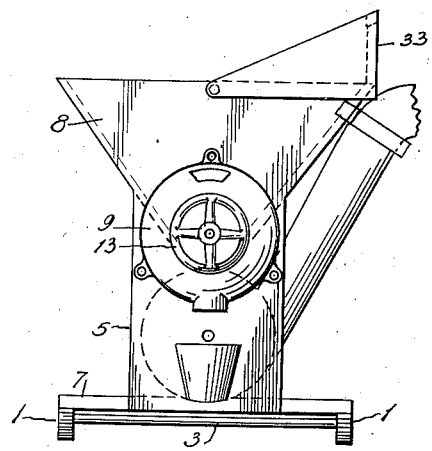
Fig.1.
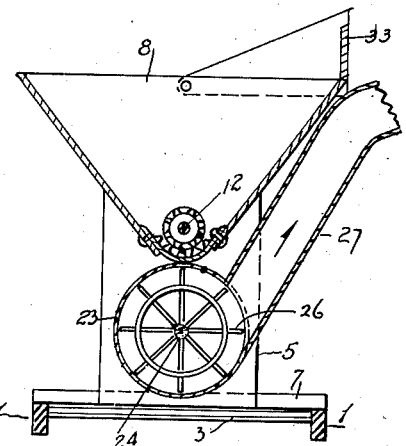
Fig.2.
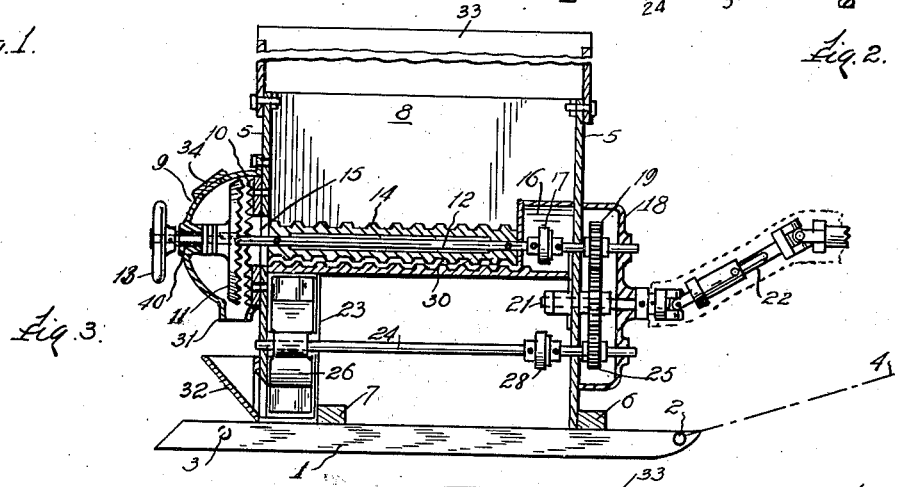
Fig.3.
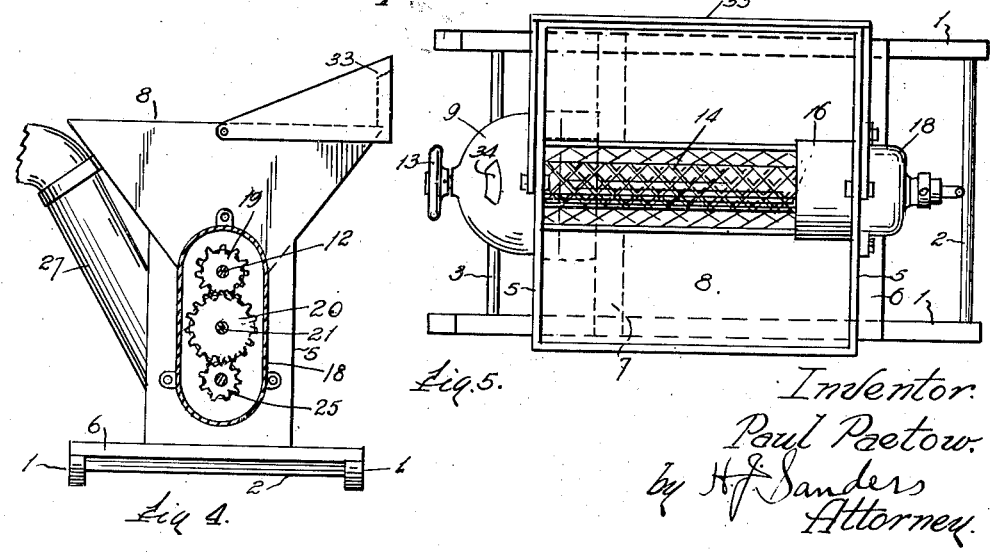
Fig.4.
Fig.5.
Inventor:
Paul Paetow.
by H. J. Sanders
Attorney.

Patented Feb. 22, 1949

2,462,542

UNITED STATES PATENT OFFICE 2,462,542

FEED GRINDER

Paul Paetow, Bryant, Iowa

Application March 21, 1946, Serial No. 655,941

1 Claim. (Cl. 241—163)

This invention relates to improvements in feed grinders for farm use and the like. One object is to provide a feed grinder to grind grain to make same more easily digestible for live stock and fowl and one that is driven by power take off from the tractor without the use of belts. A further object is to provide a feed grinder that is readily portable, being instantly attachable to the tractor for movement from place to place as desired.

A further object is to provide a feed grinder provided with an adjustable bang board to facilitate operation whether the grain is supplied to the grinder from the right or left side. A further object is to provide a feed grinder of simple inexpensive construction that is positive and efficient in operation, durable in use, compact in assembly and not easily damaged in ordinary use.

Other objects, novel features and advantages of arrangement, construction and design comprehended by the invention are hereinafter more fully pointed out or made apparent from the following description of a preferred embodiment as illustrated in the accompanying drawing wherein like reference characters denote corresponding parts throughout.

In the drawing:

Fig. 1 is a view in end elevation of a feed grinder embodying the present invention.

Fig. 2 is a transverse vertical sectional view through the feed grinder shown in Fig. 1.

Fig. 3 is a longitudinal vertical central sectional view through Fig. 1.

Fig. 4 is an end view of the feed grinder with the gear housing shown in vertical section, and, Fig. 5 is a top plan view of the feed grinder.

The reference numeral 1 denotes runners connected at the front by a bar 2 and at the rear by a bar 3, the front bar 2 receiving a draw bar 4 connected to the tractor draw bar.

Supported by said runners and connected thereto by cross braces 6, 7 are the end standards 5 that are integral with or connected to and support the hopper 8 for the grain to one end of which the casing 9 is secured that encloses the cooperating jaws 10, 11 forming the grinding burrs, the jaw 10 being fixedly secured to said hopper and to one standard 5, the movable jaw 11 being keyed to the feed shaft 12 for rotation therewith, said jaw being movable or adjustable longitudinally of said shaft by means of hand wheel 13 formed with sleeve 40 arranged upon said shaft. This jaw adjustment being for the purpose of controlling the fineness of the grind.

Fast to the rotary shaft 12 within the hopper is the feed worm 14 cooperating with the complementarily formed serrations 30 formed in the hopper pit in spaced relation to said worm to feed the grain longitudinally of said hopper and out through a perforation 15 in one hopper end wall into and between the jaws 10, 11, a portion of shaft 12 extending through a housing 16 within said hopper wherein a slip clutch 17 is arranged in well known manner to permit stoppage of said shaft should a stone or like foreign substance clog and hinder rotation of same, said shaft 12 extending from housing 16 through the adjacent hopper end wall and through the oil housing 18 carried by the hopper and having fast thereupon within said housing the pinion 19 in mesh with a drive pinion 20 upon transmission shaft 21 also arranged in oil housing 18 connected to and actuated by take-off connection 22 connected to the power shaft of the tractor. Operatively supported in the end pieces 5, in one wall of oil housing 18 and in the wall of a fan housing 23 is the fan shaft 24 also having fast thereupon within the fan housing the fan 26, said fan housing opening into the lower end of a chute 27 leading therefrom to a grain receptacle. Also provided upon said fan shaft 24 is a slip clutch 28 of the same design and purpose as slip clutch 17 to afford like protection for said shaft and fan, and a pinion 25 in mesh with the said drive pinion 20.

Referring again to the casing 9 the same is formed with a throat 31 disposed immediately above a feed pit 32 having a mouth leading into an aligned opening in one end piece 5 and through a like perforation in said fan housing 23 into said fan operatively disposed at the base of said chute 27. Hinged to the end walls of the hopper is the bang board 33 formed complementary to the upper edge of the hopper mouth that may be swung upon its hinges from one side of the hopper to the other as may be desired to direct the grain thrown at, but slightly above the level of, the hopper mouth into the same. As the feed is shoveled or otherwise precipitated into the mouth of the hopper it falls upon the feed worm 14 and is fed thereby over serrations 30 through the hopper perforation 15 between jaws 10, 11 and is ground by same. A removable plug 34 in casing 9 permits observation of the operation if desired or affords access to the casing interior for cleaning, etc. By means of hand wheel 13 the movable jaw 11 may be adjusted relative to jaw 10 upon shaft 12 to cause a fine or coarse grind as desired. From said jaws the grain passes through throat 31, pit 32 into the fan casing and is blown by the fan out through the chute 27 into the receptacle provided. When a coarse grind is desired the hand wheel 13 is moved away slightly from the casing 9 upon shaft 12 and the grain from the feed worm will force the jaw 11 outwardly.

What is claimed is:

In a portable tractor-actuated feed grinder, runners, a hopper carried thereby, grain-feeding mechanism in said hopper disposed in a direction common to said runners, a fan shaft beneath said hopper disposed in the common direction of said runners and feeding mechanism and in the plane of said feeding mechanism, grinding mechanism at one end of said feeding mechanism operatively engaged thereby and in the plane thereof and of said fan shaft, drive gearing connecting said feeding mechanism and fan shaft and in a common plane therewith, take-off drive mechanism for said gearing operatively engaged by the tractor, a feed pit immediately beneath and in line with said grinding mechanism, a fan housing communicating with said feed pit in line therewith and with said fan shaft and receiving one end of the latter, a fan within said fan housing upon said fan shaft, and a feed chute communicating with said fan housing and associated with said fan, said feed chute extending upwardly and outwardly in a direction substantially at right angles to that of said fan shaft.

PAUL PAETOW.

REFERENCES CITED

The following references are of record in the file of this patent:

UNITED STATES PATENTS

| Number | Name | Date |
|---|---|---|
| 348,585 | Raymond | Sept. 17, 1886 |
| 687,275 | Smith | Nov. 26, 1901 |
| 864,786 | Johnston | Sept. 3, 1907 |
| 1,209,790 | Woodcock | Dec. 26, 1916 |
| 1,394,082 | Greene | Oct. 18, 1921 |
| 1,595,151 | Grindle | Aug. 10, 1926 |
| 2,027,989 | Linn | Jan. 14, 1936 |
| 2,047,599 | Snyder | July 14, 1936 |